United States Patent [19]

Daniels et al.

[11] Patent Number: 4,532,097

[45] Date of Patent: Jul. 30, 1985

[54] METHOD OF FORMING FIBER REINFORCED SYNTHETIC MATERIAL WHEEL

[75] Inventors: Vernon A. Daniels, Canton; Joonmin Park, Farmington Hills; Steven Ivanyi, Walled Lake, all of Mich.

[73] Assignee: Ford Motor Company, Dearborn, Mich.

[21] Appl. No.: 334,674

[22] Filed: Dec. 28, 1981

[51] Int. Cl.³ .............................................. B32B 31/04
[52] U.S. Cl. .................................. 264/258; 264/326; 301/63 PW
[58] Field of Search ................. 301/63 PW; 264/326, 264/258

[56] References Cited

U.S. PATENT DOCUMENTS

| | | | |
|---|---|---|---|
| 2,903,388 | 9/1959 | Jonke et al. | 264/258 |
| 3,183,142 | 5/1965 | Tierney | |
| 3,369,843 | 2/1968 | Prew | 301/63 PW |
| 3,509,614 | 5/1970 | Eldred | 29/159 |
| 3,811,737 | 5/1974 | Lejeune | 301/63 PW |
| 3,917,352 | 11/1975 | Gageby | 301/63 PW |
| 3,981,955 | 9/1976 | Otani et al. | 264/255 |
| 4,017,348 | 4/1977 | Shumaker | 301/63 PW |
| 4,072,358 | 2/1978 | Ridha | 301/63 PW |
| 4,173,992 | 11/1979 | Lejeune | 301/63 PW |
| 4,177,306 | 12/1979 | Schulz | 428/107 |
| 4,350,196 | 9/1982 | Hampshire | 301/63 PW |

FOREIGN PATENT DOCUMENTS

| | | |
|---|---|---|
| 229018 | 8/1963 | Austria . |
| 1372357 | 11/1970 | United Kingdom . |
| 2045700 | 11/1980 | United Kingdom . |
| 2069422 | 8/1981 | United Kingdom ......... 301/63 PW |

*Primary Examiner*—James Derrington
*Attorney, Agent, or Firm*—Peter D. McDermott; Roger L. May

[57] ABSTRACT

A novel pre-form for a fiber reinforced synthetic material vehicle wheel comprises:

a substantially planar spider portion comprising sheet molding compound comprising randomly oriented fiber reinforced resin, substantially all of which fiber is from about 0.5 to 2 inches in length;

a first tubular section comprising fiber reinforced resin sheet surrounding said spider portion about an axis substantially normal to the plane of said spider portion; and a second tubular section surrounding and substantially coaxial with said first tubular section comprising fiber reinforced resin sheet, said fiber reinforced resin sheet of said first and second tubular sections preferably comprising random, chopped fiber of about 0.5 to 2 inches length and continuous fiber in a ratio of about from 1:1 to 1:4, respectively. A novel fiber reinforced synthetic material wheel is made by compression molding said pre-form.

19 Claims, 5 Drawing Figures

METHOD OF FORMING FIBER REINFORCED SYNTHETIC MATERIAL WHEEL

INTRODUCTION

This invention relates to new and useful wheels, particularly vehicle road wheels, and more particularly to fiber reinforced synthetic material automotive vehicle road wheels and to a method for making same in which a pre-form of said wheel is compression molded, and to said pre-form.

BACKGROUND OF THE INVENTION

Conventionally, wheels such as automotive passenger vehicle road wheels have been made of steel to provide adequate strength and durability. Such wheels must support a proportional share of the weight of the vehicle and must reliably and safely transmit the driving and braking torques between the tire and the axle hub. Such conventional steel wheels are disadvantaged, however, by their weight. In view of the growing interest in improved fuel economy, it is desirable to reduce as much as possible the weight of all vehicle components, including the wheels.

Other metals, such as, for example, aluminum have been used in place of steel to make vehicle wheels. In view of the greater cost of aluminum as compared to steel, however, aluminum wheels are typically fashioned as so-called styled aluminum wheels which are decorative and can be marketed at prices sufficient to recover the increased cost. It would be desirable, therefore, to produce styled wheels at a cost lower than that possible for aluminum styled wheels.

In the past, there have been efforts to fabricate a vehicle wheel of synthetic material. In U.S. Pat. No. 3,369,843 to Prew it was suggested that a wheel structure could be formed by building up a plurality of laminations of fiber reinforced synthetic resin materials. This method employed a cup-shaped circular mold for each half of the final wheel structure. Triangular shaped plies of reinforced resin referred to as "glass fabric cloth" were laid into the mold in overlapping relation around a central locating pin. In U.S. Pat. No. 3,917,352 to Gageby a filament winding technique is suggested for fabricating a vehicle wheel. In U.S. Pat. No. 3,811,737 to Lejeune a one-piece wheel of reinforced resin material is suggested, characterized in that the periphery of each of a plurality of hub-fastening holes is reinforced by rigid plate means such as small plates of rigid material embedded in the thickness of the disc or so-called "spider" portion of the wheel. In U.S. Pat. No. 4,072,358 to Ridha a compression molded cut-fiber reinforced plastic wheel is suggested, wherein the rim, disc and hub portions of the wheel are all uniformly and predominantly axially reinforced by cut glass fibers located in planes parallel to the axis of the wheel.

It is an object of the present invention to provide a one-piece compression molded vehicle wheel having strength and durability equal to or better than that required of steel vehicle wheels. It is also an object of the invention to provide such one-piece fiber reinforced synthetic material wheels as styled wheels at a cost far less than that of aluminum styled wheels.

It is another object of the invention to provide a fiber reinforced synthetic material vehicle road wheel which can be produced in one piece by compression molding. These and other objects of the invention will be more apparent from the following description of the invention.

SUMMARY OF THE INVENTION

According to the present invention, the foregoing and other objects are obtained by provision of a compression moldable pre-form of a fiber reinforced synthetic material vehicle wheel, which pre-form comprises:

a substantially planar spider portion comprising sheet molding compound comprising randomly oriented fibers, substantially all of which are from about 0.5 to 2 inches in length;

a first tubular section comprising fiber reinforced resin sheet surrounding said spider portion about an axis substantially normal to the plane of said spider portion; and a second tubular section surrounding and substantially coaxial with the first tubular section, preferably extending axially above and below said first tubular section, the second tubular section comprising fiber reinforced resin sheet, wherein the fibers of said fiber reinforced resin sheet of said first and second tubular sections are randomly oriented chopped fibers of about 0.5 to 2 inches length and continuous fibers in a ratio of about 1:1 to 1:4, respectively.

According to a method aspect of the invention, a method of making a fiber reinforced synthetic material wheel comprises compression molding the above described pre-form at a temperature of about from 275° to 325° F. at a pressure of about from 700 to 1500 psi for a time of about from 3 to 6 minutes.

According to a preferred embodiment of the invention, the fiber reinforced resin sheet employed in the first and second tubular sections of the pre-form comprise alternating sub-layers: a first set of one or more sub-layers of random chopped fiber reinforced resin, and a second set of one or more sub-layers of continuous fiber reinforced resin. This preferred configuration has been discovered to provide a wheel of much improved strength for any given weight of material used. In a most preferred embodiment, the continuous fibers of the second set of sub-layers are woven at a wind angle of about from 65° to 85°. Also, in a most preferred embodiment, the continuous fibers of the first tubular section are oriented approximately annularly around the axis of the tubular section and the continous fibers of the rim portion are oriented approximately parallel to that axis. The total fiber reinforced synthetic material employed in the wheel is preferably divided between the spider portion and the two tubular sections in a ratio of from about 1:1.25 to 1:1, respectively.

DESCRIPTION OF THE PREFERRED EMBODIMENTS

Figure 1:
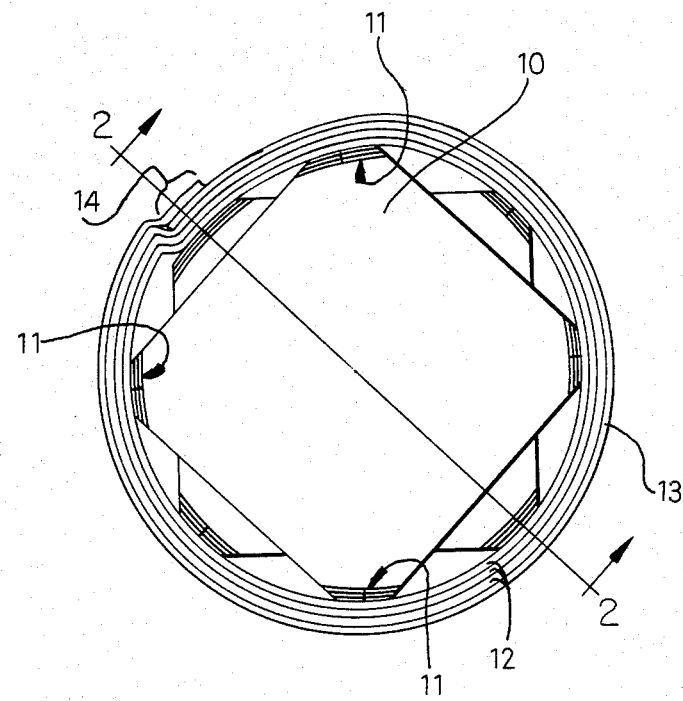
FIG. 1 is a plan view of a pre-form of a synthetic material automotive passenger vehicle road wheel according to a preferred embodiment of the invention.

As noted above, the compression moldable pre-form of the invention comprises a spider portion, a first tubular section and a second tubular section. Employing this pre-form, it will be obvious to the skilled of the art in view of the present disclosure that a wheel can be provided for any of a wide variety of applications. According to a preferred embodiment of the invention, an automotive vehicle road wheel is provided which is sue to be used in place of a conventional steel or aluminum wheel.

In general, the fiber reinforced resin of the spider portion can comprise any of several suitable fibers known to the skilled of the art such as, for example, glass roving, graphite fibers, Kevlar (trademark, E. I. duPont de Nemours & Co., Wilmington, Del.) fibers and the like or a mixture of any of them. Where an automotive vehicle road wheel is desired, however, the fiber preferably comprises glass roving in view of its low cost, high strength and commercial availability. A commercial grade of glass roving available from Owens-Corning Fiberglas Corp., Toledo, Ohio under the designation E411 has been found to provide exceptional results.

For an automotive vehicle road wheel the fiber reinforced resin of the spider portion is preferably high strength sheet molding compound, known also as HSMC. Such sheet molding compound comprises random chopped fiber, that is, the reinforcing fiber is randomly oriented and is provided in lengths of about from 0.5 to 2 inches. The fiber, preferably chopped glass roving, is usually from 40 to 55, preferably 50% by weight of the sheet molding compound. The spider portion can be fashioned of a single piece of sheet molding compound or, more preferably, of a multitude of layers of sheet molding compound which, in total, provide a thickness sufficient to give the spider portion the necessary strength and durability for its intended use. Thus, for example, in fabricating an automotive passenger vehicle road wheel, approximately 2 to 15 layers of such sheet molding compound, each about from 0.1 to 0.75 inches thick, can be used in making the spider portion of the wheel pre-form. Thus, for example, square sections of sheet molding compound, approximately 8 inches by 8 inches, can be stacked, with corners either aligned or alternatingly offset 45°, depending in part on the desired size of the spider portion. While square sections are generally preferred, since they can be cut from sheet molding compound stock with little or no waste, other, for example, round sections of sheet molding compound are also suitable.

Suitable resins are commercially available and well known to the skilled of the art. These include, for example, polyester resins, epoxy resins and vinyl ester resins. For automotive passenger vehicle road wheels and other applications calling for high strength and impact resistance and minimum wheel weight, vinyl ester resins are most preferred. More specifically, vinyl ester resins have been found to provide excellent strength, both impact strength and sheer strength. In addition, the vinyl ester resins have been found to provide excellent high temperature performance, that is, they experience less so called "creep". Creep is the deformation of the fiber reinforced resin over time, particularly at elevated temperatures and under such pressure as occurs, for example, at the points of attachment of the wheel to the axle hub. Thus, for example, resin material can creep out from under lug-nuts holding the wheel to the hub. The result would be a loosening of the attachment of the wheel to the axle hub. Vinyl ester resins have been found to be particularly resistant to such creep. Especially preferred is a proprietary vinyl ester resin composition available from Dow Chemical Company, Midland, Mich. under the designation Derakane 790. This vinyl ester resin composition is known to contain t-butylperbenzoate as catalyst. Other suitable vinyl ester resins are well known to the skilled of the art.

The resin can comprise additional ingredients known to the skilled of the art, for example, flow control agents, pigments, pigment dispersants, fillers, catalysts and the like.

The size of the spider portion is selected to render the appropriate diameter for the desired wheel. In addition it must have sufficient thickness to provide the strength and durability necessary for its intended use. Thus, for example, an automotive passenger vehicle road wheel typically must pass a so-called Rim Roll test, which tests the durability of the wheel under loads similar to those encountered in street driving, and a so-called Rotary Fatigue Test which is designed to test the strength of the wheel under loads similar to those encountered by an automotive vehicle wheel traveling around a corner. Results of such testing far in excess of that required for comparable steel wheels have been achieved for automotive passenger vehicle 13 inch road wheels made by compression molding a pre-form according to the present invention wherein the spider portion was fashioned of approximately four and one half pounds sheet molding compound (9 layers of 8 inch square 0.125 inch thick HSMC) consisting of 50% by weight Derakane 790 vinyl ester resin and 50% by weight random chopped (1 inch long) Owens-Corning Fiberglas E411 glass roving. The sheet molding compound squares where stacked so as to be alternatingly offset 45°. For a like wheel of 14 inch diameter, approximately six and one half pounds of the same sheet molding compound (13 layers, each 0.125 inch thick) provide test results far in excess of that required of comparable steel wheels. For a like wheel of 15 inch diameter, approximately seven pounds of the same sheet molding compound (16 layers, each 0.125 inch thick) provide test results far in excess of that required of comparable steel wheels.

It will be recognized by the skilled of the art that the desired thickness for the spider portion can be achieved equally well using more or less layers of sheet molding compound of lesser of greater thickness, respectively. It is desirable, however, that the sheet molding compound be distributed sufficiently uniformly over the spider portion to flow into all mold cavity areas during compression molding of the pre-form.

A first tubular section surrounds the spider portion about an axis substantially normal to the plane of the spider portion. The spider portion can be axially centered within the first tubular section or can be axially offset from center. A second tubular section surrounds and is coaxial with the first tubular section. In a pre-form for an automotive vehicle road wheel and like applications, it is preferred that the second tubular section be wider than the first tubular section, that is, that it extend axially above and below the first tubular section. The first and second tubular sections are preferably, but not necessarily, comprised of the same material. Both are comprised of fiber reinforced resin sheet, wherein the fiber content is preferably a mixture of random chopped fiber as described above, and continuous fiber. The continuous fiber can be the same material as that used for the chopped random fiber. Alternatively, different fibers can be used, including any of those mentioned above as being suitable for use in the spider portion. For automotive passenger vehicle road wheels and other applications calling for high strength and impact resistance and minimum wheel weight, glass roving is preferred and glass roving K15 (trademark, PPG Industries, Inc., Pittsburgh, Pa.) is most preferred. The continuous fiber and the random chopped fiber are used preferably in a ratio of about from 4:1 to 1:1, most preferably in a ratio of about 2:1, respectively. Where glass roving is used, the fiber reinforced resin sheet preferably comprises about from 55% to 72% glass by weight, most preferably about 65% glass by weight. In this regard it has been discovered that fiber reinforced resin sheet comprising such combination of chopped random glass fiber and continuous glass fiber provides exceptional and unexpected performance characteristics, particularly both impact strength and shear strength in all directions. In particular, it has been found to be most suitable, per unit weight, for automotive passenger vehicle road wheels in place of conventional steel or aluminum wheels. Other materials within the scope of the invention are suitable, however, for less demanding applications and/or if a greater weight of material is used to form the wheel.

While, in general, the necessary thickness of the fiber reinforced resin used in each section of the wheel preform is dictated by the degree of strength and durability desired in the finished wheel, and by the wheel design, the thickness of the first and second tubular sections required to provide a wheel of any given degree of strength and durability (and, therefore, the overall weight and cost of the wheel) is significantly reduced according to a novel, preferred configuration for the fiber reinforced resin sheet used in those sections. According to this aspect of the invention, the sheet is comprised of alternating sub-layers of fiber reinforced resin. More specifically, each of a first set of one or more sub-layers comprises random chopped fiber reinforced resin. Each of a second set of one or more sub-layers comprises continuous fiber reinforced resin. The random chopped fibers can be as described above for the spider portion of the pre-form. Preferably, glass fibers of about from 0.5 to 2 inches length, more preferably about 1 inch, are used with resin in sub-layers of about from 0.015 to 0.02 inch thick, preferably about 0.017 inch thick. The continuous fibers are continuous in the sense that substantially all extend the length or width of the fiber reinforced sheet used to form the tubular section. Most preferably the continuous fibers are woven at a winding angle of about from 65° to 85°, preferably about 80°. That is, within each such sub-layer comprising continuous fibers, a first set of continuous fibers extend substantially parallel each other and a second set of continuous fibers extend substantially parallel each other and the first set intersects the second set at an acute angle of about from 10° to 50°, preferably about 20°. The continuous fiber reinforced resin sub-layers are each preferably about from 0.015 to 0.02 inch thick, more preferably about 0.017 inch thick.

Suitably, the above described preferred fiber reinforced resin sheet can comprise from 1 to many sub-layers each of continuous fiber reinforced resin and of random chopped fiber reinforced resin. The number of sub-layers will depend, in part, on the materials employed, on the thickness of the sub-layers and on the strength and durability desired in the finished wheel. For a pre-form of an automotive passenger vehicle road wheel employing preferred materials and configuration, as described above, it has been found to be suitable, as further described below, to employ fiber reinforced resin sheet comprising about from 4 to 13 sub-layers, each of about from 0.015 to 0.02 inch thick. Fiber reinforced resin sheet according to the preferred embodiment just described is available from PPG Industries, Inc., Pittsburgh, Pa. under the trade designation "XMC".

According to a most preferred embodiment for an automotive passenger vehicle road wheel, the fiber reinforced resin sheet employed in the first tubular section and that employed in the second tubular section are so oriented that the continuous fibers of one are approximately perpendicular to those of the other. Employing fiber reinforced resin sheet wherein the continuous fibers used in the sheet are woven, as in the preferred embodiment described above, (wherein a first set of approximately parallel fibers intersects a second set of approximately parallel fibers at an acute angle of about from 10° to 50°, for example, XMC (trademark, PPG Industries, Inc., Pittsburgh, Pa.) or a like product), the fiber reinforced resin sheet of the first tubular section is most preferably so oriented that the continuous fibers thereof extend approximately circumferentially within the tubular section. In the second tubular section, which surrounds the spider portion and the first tubular section, the fiber reinforced resin sheet is so oriented that the continuous fibers thereof are approximately parallel to the axis of the wheel pre-form. Thus, the continuous fibers of the second tubular section extend approximately perpendicular to those of the first tubular section. More accurately, a line bisecting the acute angle of intersection of the two sets of continuous fibers in each of the continuous fiber-reinforced sub-layers of the second tubular section is approximately perpendicular to a line bisecting the acute angle of intersection of the two sets of continuous fibers in each of the continuous fiber-reinforced sub-layers of the first tubular section.

While the thickness of the fiber reinforced resin sheet used in the first and in the second tubular section will be dictated by the desired size of the finished wheel and by the degree of strength and durability desired for the finished wheel, fiber reinforced resin sheet comprising the above described preferred materials has been discovered to provide far greater strength and durability per unit weight of fiber reinforced resin sheet than other known fiber reinforced resin materials. Accordingly, for example, a 13 inch automotive passenger vehicle road wheel, having strength and durability exceeding that required of conventional steel wheels, can be made using a first tubular section comprising two layers of 0.15 inch thick XMC (trademark, PPG Industries, Inc., Pittsburgh, Pa.) or a similar fiber reinforced resin sheet product, approximately 3 to 6 inches wide. The second tubular section comprises a single layer, (but preferably with some overlap) of the same material, approximately 4 to 8 inches wide. According to this embodiment, a wheel pre-form for such a 13 inch wheel would comprise, in total, as little as approximately nine pounds of fiber reinforced resin, of which the two tubular sections comprise only approximately four and one half pounds of XMC (trademark) or like resin sheet product. Similarly, a 14 inch wheel would comprise as little as approximately 13 pounds, of which one half would be in the two tubular sections, and a 15 inch wheel could comprise as little as approximately 14 pounds of fiber reinforced resin.

For an automotive passenger vehicle road wheel according to the preferred embodiment, the fiber reinforced resin is divided between the spider portion and the two tubular sections in a ratio of about from 0.9:1 to 1.1:1, respectively. Pre-forms comprising fiber reinforced resin materials other than sheet molding compound in the spider section and XMC (trademark, PPG Industries, Inc., Pittsburgh, Pa.) or the like in the two tubular sections have been found to require far greater thickness and weight of material to provide wheels of equivalent strength and durability. Such heavier wheels would, obviously, provide less fuel economy and less cost advantage.

According to a method aspect of the present invention, the fiber reinforced synthetic material vehicle road wheels described above can be made, in view of the present disclosure, using compression molding techniques well known to the skilled of the art. More specifically, a wheel pre-form as described above can be molded in a compression molding tool designed to provide the desired configuration for the finished wheel. The wheel can be molded in a preheated mold by applying suitable molding pressure for an appropriate molding cycle. Typically, the molding pressure for a wheel pre-form comprising the preferred material as described above will range between about 700 and 1500 psi. Generally preferred is about 1000 psi. The mold temperature for the preferred material as described above will range between about 275° and 325° F. Generally, about 300° F. is preferred. The molding cycle time is dependent on molding temperature, the materials employed in the pre-form, and the thickness of the various sections in the pre-form. Generally, a higher mold temperature and/or a longer cycle time will be required for thicker sections. Obviously, however, the temperature must be appropriate for the materials employed in the pre-form. Thus, for example, mold temperatures below about 350° F. should be used for vinyl ester resins, since they have a tendency to pre-gel above that temperature. Typically, the molding cycle time will be from about 3 to 6 minutes. In the compression molding of a 13 inch automotive passenger vehicle road wheel employing the preferred materials and amounts of materials described above, for example, a mold temperature of 300° F. and pressure of 1000 psi has been found suitable to produce a finished wheel within 4 minutes molding cycle time. In any event, it will be apparent to the skilled of the art that the compression molding time, temperature and pressure should be selected such that the resin is afforded an opportunity to fill all areas of the mold cavity, especially the rim area. The finished wheel is yet another aspect of the present invention.

According to a preferred embodiment of the method aspect of the invention, prior to insertion into the compression molding tool, the wheel pre-form is pressed so as to give it a concave arc along the axis of the pre-form around the entire circumference of the pre-form. This can be accomplished easily while the resin of the fiber reinforced resin material is fresh and malable. The advantages provided by this additional processing step include proper preform fit and configuration in the mold cavity.

Figure 2:
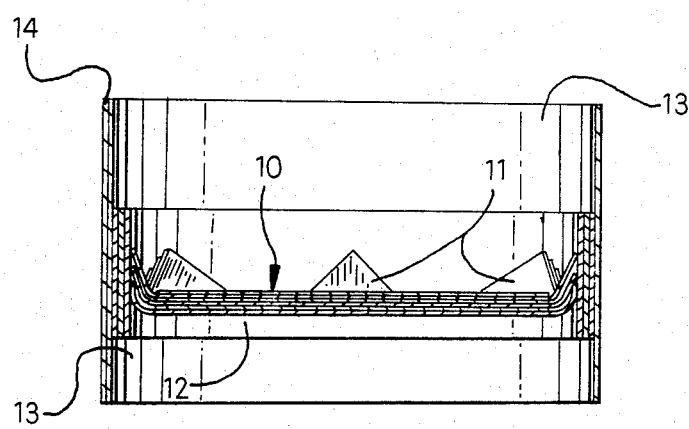
FIG. 2 is a cross-sectional view of the pre-form of FIG. 1 taken along line 2—2.

Referring now to the drawings, FIG. 1 illustrates an automotive passenger vehicle road wheel pre-form according to a preferred embodiment of the invention. The wheel is viewed along an axis normal to the essentially planar spider portion 10. The spider portion is formed of square pieces of sheet molding compound stacked one on top of another such that the corners of each are offset 45° from those of the piece immediately above and below it. The corner portions 11 are bent upwardly such that the spider portion has a somewhat rounded periphery. The upturned corner portions are in contact with first tubular section 12. The first tubular section comprises several layers of fiber reinforced resin sheet, wherein the fiber is a mixture of random chopped glass roving and continuous glass roving. Surrounding and concentric with the first tubular section is a second tubular section 13. The second tubular section comprises a single layer, but for an overlapping portion 14, of the same fiber reinforced resin sheet used for the first tubular section. FIG. 2 presents a cross-sectional view of the pre-form of FIG. 1, taken along line 2—2 in FIG. 1.

Figure 3:
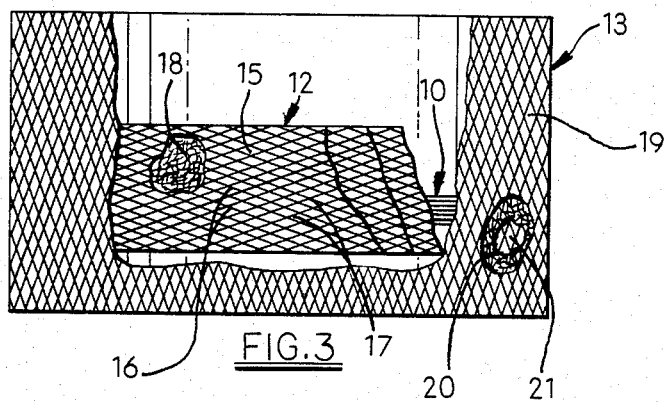
FIG. 3 is a somewhat enlarged, partially fragmented elevational view of the pre-form of FIG. 1.

FIG. 3 is an elevational view, partially fragmented, of the pre-form of FIG. 1. This illustration is somewhat enlarged to more clearly show the novel configuration of the preferred fiber reinforced resin sheet used in the first tubular section and second tubular section. The outer surface 15 of the first tubular section 12 shows the outermost of multiple sub-layers. Therein each of a first set of continuous fibers 16 is substantially parallel each other and each of a second set of continuous fibers 17 is substantially parallel each other, the two sets of fibers intersecting one another at an acute angle of approximately 20°. (Thus, such continuous fibers are woven at a winding angle of about 80°, i.e., 90° less one half the acute angle.) As shown by the cut-away on the surface of the first tubular section, the fiber reinforced resin sub-layer 18 adjacently underlying the outermost sub-layer, comprises chopped random fiber. The fiber reinforced resin sheet employed in the first tubular section consists of multiple additional sub-layers (not shown) of such continuous fiber reinforced resin alternating with sub-layers of random chopped fiber resinforced resin.

Similarily, the outer surface 19 of the second tubular section 13 consists of fiber reinforced resin wherein the fibers are continuous fibers and are woven at a winding angle of about 80°. As shown by the cut-away, a sub-layer, 20, of random chopped fiber reinforced resin underlies that outermost sub-layer of continuous fiber reinforced resin. Cut-away 21 within sub-layer 20 reveals the alternating nature of the sub-layers forming the fiber reinforced resin sheet employed in the tubular sections of the pre-form. That is, it reveals that under the sub-layer of random chopped fibers revealed by the cut-away in outermost sub-layer 20 is an adjacent sub-layer of continuous fiber reinforced resin of materials and orientation substantially the same as outermost sub-layer 20. Additional sub-layers of fiber reinforced resin (not shown) underlie the sub-layers exposed by the cut-aways wherein random chopped fiber reinforced resin sub-layers alternate with continuous fiber reinforced resin sub-layers.

Figure 4:
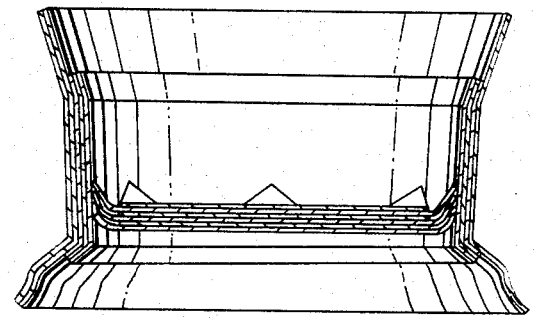
FIG. 4 is a cross-sectional view of the pre-form of FIG. 1 as shaped prior to compression molding according to a preferred embodiment of the method of the invention.
Figure 5:
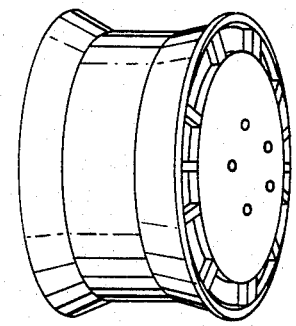
FIG. 5 is a perspective view of a decorative synthetic material automotive passenger vehicle road wheel formed by compression molding the pre-form illustrated in FIG. 1.

FIG. 4 is a cross-sectional view of a pre-form according to a preferred embodiment of the invention, which pre-form has been pressed to give it a concave arc along the axis of the wheel. The pre-form of FIG. 4 can next be compression molded to form a synthetic material automotive passenger vehicle road wheel according to the invention. FIG. 5 illustrates such a compression molded road wheel. It will be recognized that the decorative relief provided on the surface of the spider portion is aesthetic in nature and can be altered or deleted as desired.

EXAMPLE I

A thirteen inch size, decoratively styled, synthetic material automotive passenger vehicle road wheel according to the invention was made according to the following procedure. Eleven pieces of eight inch square, ⅛ inch thick sheet molding compound were stacked to form a spider portion weighing approximately four and one half pounds. The sheet molding compound consisted approximately of 50% by weight random, chopped (1 inch length) E411 (trademark, Owens-Corning Fiberlas Corp., Toledo, Ohio) glass roving in Derakane 790 (trademark, Dow Chemical Company, Midland, Mich.) vinyl ester resin. Each piece was off-set 45° from adjacent pieces and the corners were bent upwardly. The spider portion was wrapped with a first tubular seciton, 5 inches in height, (approximately 4 inches above and 1 inches below the plane of the spider portion), consisting of three layers of 0.15 inch thick XMC (trademark, PPG Industries, Inc., Pittsburgh, Pa.) fiber reinforced resin sheet. The fiber reinforced resin sheet consisted of two sets of alternating sub-layers. Each sub-layer of the first set of sub-layers consisted of continuous glass roving reinforced resin, woven at a winding angle of 80°. Each sub-layer of the second set of sub-layers consisted of random, chopped glass roving reinforced resin. The sheet was oriented such that the continuous glass roving ran substantially circumferentially within the tubular section. A second tubular section consisted of a single layer (but for seven inches of overlap), eight inches high, wrapped concentrically around the first tubular section. It consisted of the same XMC (trademark, PPG Industries, Inc., Pittsburgh, Pa.) fiber reinforced resin sheet used in the first tubular section. The second tubular section extended axially beyond the first tubular section approximately 1.5 inches below and 1.5 inches above the first tubular section. It was so oriented that the continuous glass roving thereof ran substantially parallel to the axis of the tubular section. Together, the first and second tubular section weighed four and one half pounds. The pre-form so made was compression molded under a pressure of 150 tons in a mold heated to about 300° F. (about 150° C.) for four minutes. The molded wheel was removed from the mold and allowed to cool.

EXAMPLE II

The synthetic material road wheel of Example I was tested for strength and durability according to the following procedures and tested for defects according to the definitions given below, which test procedures and failure definitions are the same as those which have been used for conventional sheet and styled aluminum automotive passenger vehicle road wheels.

A. Rotary Fatigue Test

The wheel was mounted on a typical rotary fatigue test fixture well known to the skilled of the art. The wheel nut torque was set to 85±5 ft. lbs. A test load of 1210 ft. lbs. was applied and the wheel was run under that test load for 50,000 cycles at 300 rpm. After 50,000 cycles the test load was removed and the wheel was checked for failure in any of the following modes:

a. A change in the mean runout of the loading arm greater than or equal to 0.060 inch measured normal to the axis of rotation.
b. Any crack or fracture which can be detected by dye penetrant inspection using magnaflux spotcheck or equivalent method known to the skilled of the art.
c. Wheel lug nut torque below 50 ft./lbs. for any nut when measured in the tightening direction.

Intermediate Test Results: The wheel showed no failure in any of the defined modes following said 50,000 cycles.

The lug nut torque was reset to 85 ft. lbs., the test load was reapplied and the test was continued to 100,000 cycles. The wheel was again checked for failure(s) as defined above.

Final Test Results: The wheel again showed no failure in any of the defined modes.

B. Rim Rolling Fatigue Test

A treadless, tubeless radial test tire was mounted on the wheel. The tire was inflated to a cold inflation pressure of 65±5 psi. The wheel with tire was then mounted on a typical rim rolling test fixture such as are well known to the skilled of the art. Wheel nut torque was set to 85 ft. lbs. minimum. A test load of 2300 lbs was applied and the wheel was run under that test load at a constant RPM of 300 for 750,000 cycles. After 750,000 cycles the test load was removed and the wheel was inspected for failure in any of the following modes:

a. Loss of air pressure during testing to below 50 psi which can be traced to a crack in the rim as described in (b).
b. Any crack in the rim detected by dye penetrant inspection using magnaflux spotcheck or equivalent method known to the skilled of the art.

Intermediate Test Results: The wheel showed no failure in either of the defined modes.

The test load was reapplied and the test was continued to 2,000,000 cycles. The wheel was again checked for failure in either of the defined modes.

Final Test Results: The wheel again showed no failure in any of the defined modes.

C. Additional Testing

Several thirteen inch size decoratively styled passenger vehicle road wheels, produced as described above, were tested to four million cycles of rim roll fatigue as described in part B, four hundred thousand cycles of rotary fatigue as described in part A, 1500 cycles of grist mill testing according to methods well known to the skilled of the art, and four hundred fifty thousand total accumulated vehicle test miles on three vehicles, all without any failure in any mode defined above.

EXAMPLE III

A fourteen inch size decoratively styled synthetic material automotive passenger vehicle road wheel was made according to the procedure of Example I, with the following modifications. The spider portion consisted of 12 sheets of 9.5 inch by 9.5 inch squares of the sheet molding compound. The first tubular section consisted of 2 layers of 5 inch wide XMC (trademark, PPG Industries, Inc., Pittsburgh, Pa.) and the second tubular section consisted of one layer, (but for 8 inches of overlap) of 8 wide XMC (trademark, PPG Company, Pittsburgh, Pa.). Six and one half pounds of sheet molding compound were used to form the spider portion and an equal amount was used to form the two tubular sections. The pre-form was compression molded at the same pressure and temperature and for the same length of time as was the thirteen inch wheel pre-form in Example I. The compression molded wheel was removed from the mold and allowed to cool.

EXAMPLE IV

The synthetic material road wheel of Example III was tested for strength and durability according to the procedures of Example II.

A. Rotary Fatigue Test Results

The wheel showed no failure in any of the defined modes at either the intermediate or final testing.

B. Rim Rolling Fatigue Test Results

The wheel showed no failure in either of the defined modes at either the intermediate or final testing.

C. Additional Testing

Several fourteen inch size decoratively styled passenger vehicle road wheels, produced as described in Example III, were subjected to twenty million cycles of rim roll fatigue testing as described in Example II. B, two hundred thousand cycles of rotary fatigue testing as described in Example II. A, 1500 cycles of grist mill testing according to methods well known to the skilled of the art, and four hundred thousand miles total accumulated vehicle test miles on 15 vehicles, all without any failure in any mode defined above.

Particular embodiments of the present invention described above are illustrative only and do not limit the scope of the invention. It will be apparent to the skilled of the art in view of the foregoing disclosure that modifications and substitutions can be made without departing from the scope of the invention.

We claim:

1. A method of making a fiber reinforced synthetic material automotive vehicle wheel, which method comprises:
(A) providing a compression moldable pre-form of a synthetic material wheel, which pre-form comprises:
   a substantially planar spider portion comprising random, chopped fiber reinforced resin;
   a first tubular section comprising fiber reinforced resin sheet surrounding said spider portion about an axis substantially normal to the plane of said spider portion; and
   a second tubular section comprising fiber reinforced resin sheet surrounding and substantially coaxial with said first tubular section, extending axially in both directions beyond said first tubular section, said fiber reinforced resin sheet of said first tubular section and said second tubular section each comprising random, chopped fiber and continuous fiber; and
(B) compression molding said pre-form at a temperature of about from 275° to 325° F., at a pressure of about from 700 to 1500 psi, for a time of about from 3 to 6 minutes.

2. The method of claim 1, wherein the resin of said spider portion, said first tubular section and said second tubular section each consists essentially of vinyl ester resin.

3. The method of claim 1, wherein substantially all of said random, chopped fiber of said spider portion is from about 0.5 to 2 inches in length.

4. The method of claim 1, wherein said spider portion comprises sheet molding compound.

5. The method of claim 1, wherein substantially all of said random, chopped fiber of said fiber reinforced resin sheet is from about 0.5 to 2 inches in length.

6. The method of claim 1, wherein said continuous fiber and said random, chopped fiber are present in said fiber reinforced resin sheet in a weight ratio of about from 1:1 to 4:1, respectively.

7. The method of claim 1, wherein the fiber of said spider portion comprises glass roving.

8. The method of claim 1, wherein said random, chopped fiber reinforced resin of said spider portion comprises 45% to 55% by weight glass roving.

9. The method of claim 1, wherein the continuous fiber of said fiber reinforced resin sheet comprises glass roving.

10. The method of claim 1, wherein said fiber reinforced resin sheet comprises about from 55% to 72% by weight glass roving.

11. The method of claim 1, wherein said fiber reinforced resin sheet of said first and second tubular sections comprises alternating sub-layers of fiber reinforced resin, wherein each of a first set of one or more sub-layers comprises random chopped fiber reinforced resin and each of a second set of one or more sub-layers comprises continuous fiber reinforced resin.

12. The method of claim 11, wherein substantially all of the random chopped fiber of said first set of sub-layers is about 0.5 to 2 inches in length.

13. The method of claim 11, wherein the continuous fibers within a sub-layer comprise a first set of continuous fibers substantially parallel each other and a second set of continuous fibers substantially parallel each other, said first set of fibers intersecting said second set of fibers at an acute angle of about from 10° to 50°.

14. The method of claim 11, wherein said fiber reinforced resin sheet employed in said first tubular section and said fiber reinforced resin sheet employed in said second tubular section are so oriented in the preform that the continuous fibers of the first are approximately perpendicular to the continuous fibers of the second.

15. The method of claim 11, wherein said second tubular section extends axially in both directions beyond said first tubular section.

16. The method of claim 11, wherein said spider portion is axially offset from the center of said first tubular section.

17. A method of making a fiber reinforced synthetic material automotive vehicle road wheel, which method comprises:
(A) providing a compression moldable pre-form for an automotive vehicle road wheel comprising:
   a substantially planar spider portion comprising sheet molding compound comprising about from 45% to 55% by weight random, chopped glass roving, substantially all of which is about from 0.5 to 2 inches in length;
   a first tubular section comprising fiber reinforced resin sheet surrounding said spider portion about an axis substantially normal to the plane of said spider portion; and
   a second tubular section surrounding and substantially coaxial with said first tubular section, extending axially in both directions beyond said first tubular section, wherein said fiber reinforced resin sheet of said first and second tubular sections each comprises alternating sub-layers of fiber reinforced resin wherein each of a first set of one or more sub-layers comprises random, chopped glass roving, substantially all of which is about from 0.5 to 2 inches in length, and wherein each of a second set of one or more sub-layers comprises continuous glass roving, said continuous glass roving and said random, chopped glass roving being present in said fiber reinforced resin sheet in a weight ratio of about from 1:1 to 4:1, respectively, and in combined amount of about from 55% to 72% by weight, wherein the continuous glass roving within a sub-layer comprises a first set of continuous fibers substantially parallel each other and a second set of continuous fibers substantially parallel each other, said first set of fibers intersecting said second set of fibers at an acute angle of about from 10° to 50°, and wherein said continuous fibers of said first tubular section are approximately perpendicular to the continuous fibers of said second tubular section; and (B) compression molding said pre-form at a temperature of about from 275° to 325° F., at a pressure of about from 700 to 1500 psi, for a time of about from 3 to 6 minutes.

18. The method of claim 17, wherein the resin of said spider portion, said first tubular section and said second tubular section each consists essentially of vinyl ester resin.

19. The method of claim 17, wherein said spider portion is axially offset from the center of said first tubular section.

* * * * *